(No Model.)
J. J. LAWLER.
TRAP VALVE.
No. 306,268. Patented Oct. 7, 1884.
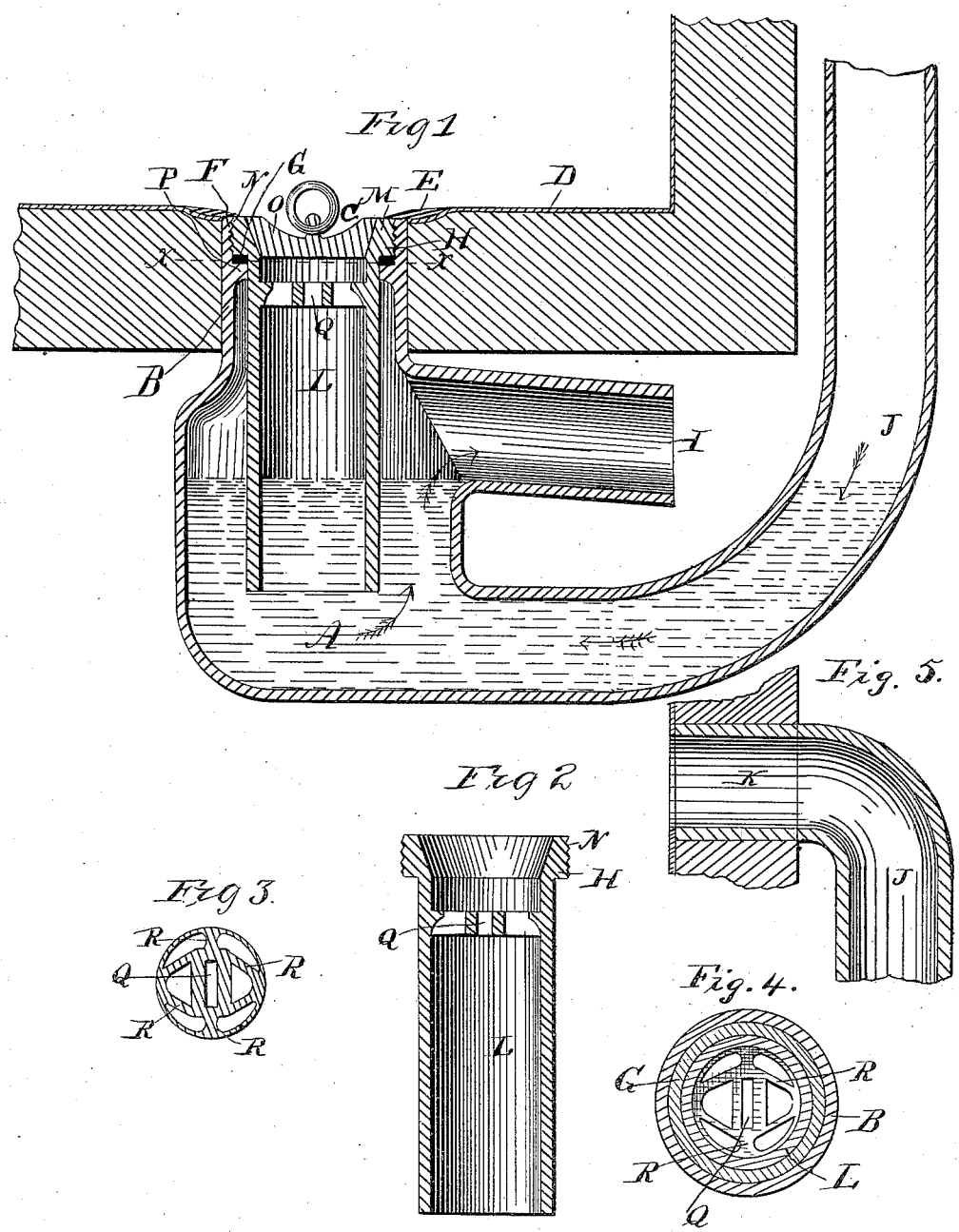

United States Patent Office.

JAMES J. LAWLER, OF SCRANTON, PENNSYLVANIA.

TRAP-VALVE.

SPECIFICATION forming part of Letters Patent No. 306,268, dated October 7, 1884.

Application filed October 13, 1883. (No model.)

*To all whom it may concern:*

Be it known that I, JAMES J. LAWLER, a citizen of the United States of America, residing at Scranton, in the county of Lackawanna and State of Pennsylvania, have invented certain new and useful Improvements in Trap-Valves, of which the following is a specification, reference being had therein to the accompanying drawings.

This invention relates to that class of water-traps which are connected to bath-tubs, wash-basins, wash-tubs, sinks, &c., for the purpose of preventing sewer-gas and impure air from entering the apartments of houses through the waste-pipes connected with their water-fixtures.

The object of my invention is to provide a trap possessing superior advantages in point of simplicity, inexpensiveness, durability, and general efficiency, whereby it can be readily connected to all kinds of water-fixtures. It will act as a trap for both the bottom outlet and overflow-outlet of the fixture, and whereby it can be readily opened for substitution, inspection, or cleaning without removing any part of the fixture or the floor, the said trap being set close up to the outlet-opening, substantially as will be hereinafter more fully described, and particularly pointed out in the claims.

In the drawings, Figure 1 is a vertical longitudinal sectional view of my improved trap as applied to the bottom outlet of a bath-tub. Fig. 2 is a view of the tubular section detached. Fig. 3 is a detail view of the strainer. Fig. 4 is a horizontal sectional view taken on the line *x x*, Fig. 1. Fig. 5 is a sectional detail view at the overflow-opening of the tub.

Corresponding parts in all the figures are denoted by the same letters of reference.

Referring to the drawings, A designates the globular body of my improved trap, the top portion or neck, B, of which is neatly fitted in the corresponding bottom outlet-opening, C, of the bath-tub D, and is secured therein in any suitable manner, preferably by a rim, E, of solder, as shown.

On the interior of the neck B are formed screw-threads F, below which is formed a shoulder, G, that supports a washer, H, the purpose of which will be presently described.

The body A is provided with two branches, I J, respectively disposed one above the other, the top branch, I, of which connects directly with the soil-pipe (not shown) to secure a perfect ventilation, while the bottom branch, J, extends to the overflow-opening K of the tub, so that the one trap serves for both the bottom outlet and overflow-opening.

L is a tubular section or chamber, which is provided with a circumferential flange or enlargement, M, at its top end, in which flange are formed screw-threads N, that engage with threads F to secure the tube in position in the neck B when the washer H comes against the under edge of flange M, and secures a perfectly air-tight joint. The lower end of tube L extends below the water-line in the trap, which is on the plane of the bottom of the outlet-branch I, to form the water-seal, as shown.

O is the usual plug or stopper to prevent flow of the water out of the tub, which stopper is received by the mouth of tube L.

P is a strainer, which is formed in the tube L near its top. This strainer is preferably formed by a web comprising a central oblong opening, Q, from the corners of which extend connecting portions R, which serve as braces to meet the strain when a screw-driver is adjusted in the opening Q to set or remove the tube L in the neck of the body of the trap.

The operation and advantages of my invention will be readily understood by reference to the foregoing description and the annexed drawings.

The trap completely prevents the entrance of sewer-gas or impure air into the apartment, and will not permit air to circulate down through the bottom outlet and up through the overflow-opening of the tub or other water-fixture.

The tube L can be conveniently removed by use of a common screw-driver, for purposes of cleaning, repair, or substitution.

It will be observed that the trap embodies the plug and strainer of the outlet-opening, and that it is applied directly to the bath-tub or other fixture, so that the waste and ventilation of the fixture to which it is applied is entirely independent of all other water-fixtures in the house.

I claim as my invention—

1. A trap-valve consisting of the globular body A, having branches I J, and secured by rim E in opening C, neck B, having screw-threads F, and shoulder G, washer H, tubular section or chamber L, having circumferential flange M, and strainer P, having oblong opening Q, substantially as shown and described.

2. The combination, with the body of the trap, having interior screw-threads at its top or neck portion, of the removable tubular section having exterior screw-threads at its top end, and formed with an interior strainer comprising an opening constructed to receive a screw-driver by which the tube can be set and removed, substantially as and for the purpose set forth.

3. The combination of the body of the trap, having the interior screw-threads at its top or neck portion, a washer or gasket arranged under these screw-threads, a tubular section having an exterior circumferential top flange in which are formed screw-threads, said flange coming against the washer, a strainer formed in the tube, and a plug for the mouth of the latter, substantially as and for the purpose set forth.

4. In a trap, the removable tubular section having an interior strainer, and embodying a central opening constructed to be engaged by a screw-driver, substantially as set forth.

In testimony whereof I affix my signature in presence of two witnesses.

JAMES J. LAWLER.

Witnesses:
 M. E. McDONALD,
 THOS. F. CAWLEY.